United States Patent [19]
McCurry et al.

[11] Patent Number: 5,987,758
[45] Date of Patent: Nov. 23, 1999

[54] QUICK-CHANGE BLADE CLAMP

[75] Inventors: Ronald C. McCurry, West Union; Tracy Patrick Long, Seneca; Richard Changhuei Yo, Greer, all of S.C.

[73] Assignee: Ryobi North America, Inc., Anderson, S.C.

[21] Appl. No.: 08/959,155

[22] Filed: Oct. 28, 1997

[51] Int. Cl.⁶ .................................................. B27B 19/02
[52] U.S. Cl. .......................... 30/392; 83/699.21; 279/77; 30/394
[58] Field of Search ..................... 30/392–94; 83/699.21; 279/76–77, 87

[56] References Cited

U.S. PATENT DOCUMENTS

| | | | |
|---|---|---|---|
| 3,583,716 | 6/1971 | Daniel, Jr. | 279/81 |
| 3,781,025 | 12/1973 | D'Angelo | 279/83 |
| 3,823,473 | 7/1974 | Hoffman | 30/338 |
| 4,106,181 | 8/1978 | Mattchen | 279/77 X |
| 4,283,855 | 8/1981 | Nalley | 30/394 |
| 4,290,721 | 9/1981 | Knoll | 409/234 |
| 4,299,402 | 11/1981 | Hoffman | 279/75 |
| 4,601,477 | 7/1986 | Barrett et al. | 279/30 |
| 4,648,182 | 3/1987 | Hoffman | 30/392 |
| 4,710,223 | 12/1987 | Matejczyk | 75/248 |
| 5,322,302 | 6/1994 | Quirijnen | 30/392 X |
| 5,443,276 | 8/1995 | Nasser et al. | 279/77 |
| 5,487,221 | 1/1996 | Oda et al. | 30/392 |
| 5,634,277 | 6/1997 | Wada et al. | 30/392 |
| 5,722,309 | 3/1998 | Seyerle | 83/699.21 |
| 5,724,742 | 3/1998 | Grabowski | 30/392 |

FOREIGN PATENT DOCUMENTS

0719610A1  3/1996  European Pat. Off. .

*Primary Examiner*—Rinaldi I. Rada
*Assistant Examiner*—T. Anthony Vaughn
*Attorney, Agent, or Firm*—Brooks & Kushman P.C.

[57] ABSTRACT

A toolless blade clamp is disclosed for mounting a saw blade to the drive shaft of a reciprocating saw, such as a jigsaw. The clamp has a housing formed with a channel into which the blade may be inserted and an inclined track along which a roller is movable. The roller is biased by a spring into engagement with the blade during operation of the reciprocating saw. A release device, also attached to the spring, is pivotally mounted to the housing and may be rotated against the spring load from a locked position adjacent the housing to an unlocked position away from the housing. A pair of elongated links are pivotally connected to the release device and pivotally support the roller therebetween. The links act to translate rotation of the release device to movement of the roller, such that rotation of the release device to the unlocked position pulls the roller away from the blade allowing the blade to be removed from the channel.

24 Claims, 5 Drawing Sheets

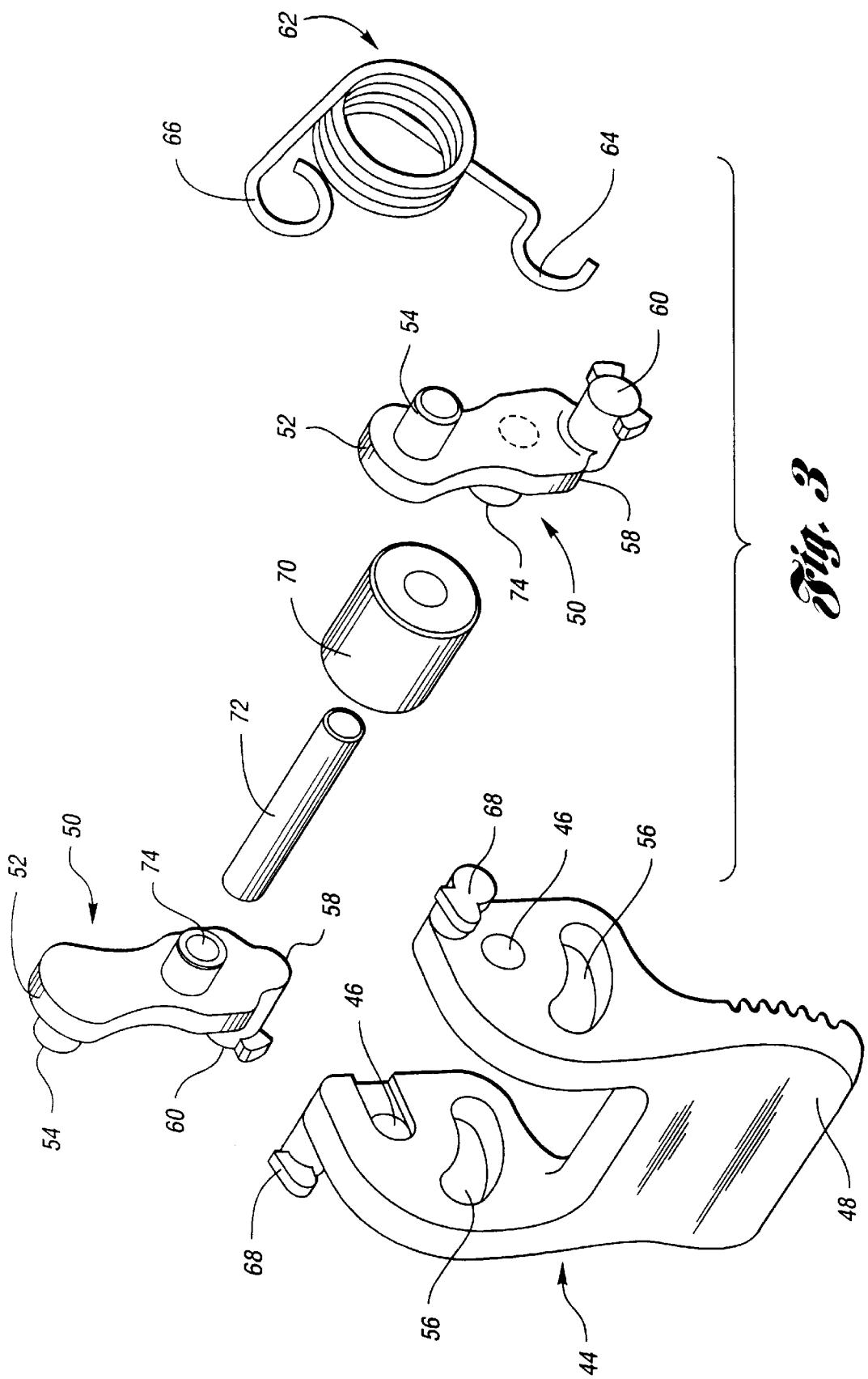

QUICK-CHANGE BLADE CLAMP

TECHNICAL FIELD

This invention relates to a toolless blade clamp, and in particular to a blade clamp for use with a reciprocating saw such as a jigsaw.

BACKGROUND ART

In operation, a jigsaw or the like requires a clamp to firmly retain the saw blade during endwise reciprocation of the motor drive shaft. Numerous methods have been employed in an attempt to reliably secure the saw blade within the clamp housing. For example, U.S. Pat. No. 3,781,025 to D'Angelo teaches the use of set screws tightened against opposite sides of the blade, whereas U.S. Pat. No. 4,290,721 to Knoll discloses a variation wherein clamps surrounding the blade are tightened with screws. The first configuration locally deforms the saw blade placing it under excessive strain, and both methods are subject to the loosening of screws due to the reciprocatory motion of the blade. Furthermore, requiring a tool to release and tighten the screws each time a saw blade is to be changed is tedious.

Alternative methods to retain a saw blade, such as those detailed in U.S. Pat. No. 3,583,716 to Daniel, Jr., U.S. Pat. No. 3,823,473 to Hoffman, and U.S. Pat. No. 4,299,402 to Hoffman, have involved the use of blades having apertures or notches which are engaged by pins or cams in order to secure the blade in its inserted position. However, these cutouts compromise the structural integrity of the blade and restrict the form of saw blade capable of being accommodated by each clamp.

Therefore, a blade clamp should be able to accept any arrangement of saw blade without requiring tools to change the blade. To this end, U.S. Pat. No. 4,601,477 to Barrett et al. and published European Patent Application No. EP 0719610A1 to Woodward et al. disclose a blade clamp capable of gripping an unnotched or unapertured blade via contact with a spring-loaded roller, and providing release of the blade through a manual shift of the roller against the spring load. However, the release device used to shift the roller away from the blade either obstructs the field of view or only provides for limited roller movement. Furthermore, the clamp housing lacks durability during periods of extended use.

DISCLOSURE OF THE INVENTION

It is an object of the present invention to provide a toolless blade clamp for use with a reciprocating saw, such as a jigsaw, which is capable of retaining a blade securely during operation of the saw and providing a quick release of the blade when the blade is to be changed.

It is a further object of the present invention to provide a blade clamp having a release device which will provide for adequate roller movement without obstructing the field of view.

It is a still further object of the present invention to provide a blade clamp which grips the blade with substantial force.

It is another object of the present invention to provide a blade clamp having a housing with increased durability.

Accordingly, a blade clamp is provided for mounting an elongated, generally planar blade of rectangular cross-section to a drive shaft of a reciprocating saw. The clamp comprises a housing having a connector groove for affixing the housing to the drive shaft and a channel formed with an opening into which the blade may be inserted. The channel has a back channel wall extending parallel to a longitudinal blade axis and in contact with a first blade edge, at least one side channel wall aligned in close proximity to the blade, and an abutment acting to limit the insertion distance of the blade into the channel. A roller is provided which is movable along a path inclined relative to the blade axis, so that movement of the roller in a first direction results in movement of the roller generally away from the back channel wall, whereas movement of the roller in a second direction results in movement of the roller generally toward the back channel wall into engagement with the blade. A release device provided with a handle is adjustably mounted to the housing such that the release device may be moved with respect to the housing from a locked position adjacent the housing to an unlocked position away from the housing. At least one link is pivotally connected to the release device and pivotally supports the roller. The link acts to couple movement of the release device to movement of the roller such that movement of the release device to the unlocked position pulls the roller in the first direction allowing the blade to be removed from the channel. At least one spring is provided to bias the roller in the second direction causing the roller to contact the blade when the release device is in the locked position, thereby securely clamping the blade to the housing during operation of the reciprocating saw.

In one embodiment, a pair of spaced side channel walls are provided, and the roller has a roller axis perpendicular to the blade axis and is oriented such that the roller engages the blade at a second blade edge. The roller moves along a track formed within the housing which, in the preferred embodiment, is inclined such that movement of the roller in a direction generally away from the abutment results in movement of the roller generally toward the back channel wall into engagement with the second blade edge. This orientation ensures that any force tending to dislodge the blade from the housing will, through inertia of the roller, cause the blade to be gripped more firmly.

In the preferred embodiment, the release device comprises a lever pivotally mounted to the housing, and a pair of elongated links pivotally mounted to the lever pivotally support the roller therebetween. A pair of coiled springs are provided, and a first end of each spring is attached to a pair of link attachment knobs spaced beyond the pivotal attachment of the roller. This configuration increases the mechanical advantage of the springs on the roller, thereby increasing the force of the roller against the blade edge and clamping the blade more securely. A second end of each spring is attached to a pair of lever attachment knobs spaced from the pivot joints, forcing the lever into the locked position adjacent the clamp housing. Furthermore, the housing is formed of an iron alloy using an injection-molded process, thereby increasing the overall durability of the clamp.

The above objects and other objects, features and advantages of the present invention are more readily understood from a review of the attached drawings and the accompanying specification and claims.

BRIEF DESCRIPTION OF THE DRAWINGS

FIG. 3 is a three-dimensional, exploded view of the lever, roller-link system, and spring.

BEST MODE FOR CARRYING OUT THE INVENTION

Figure 1:
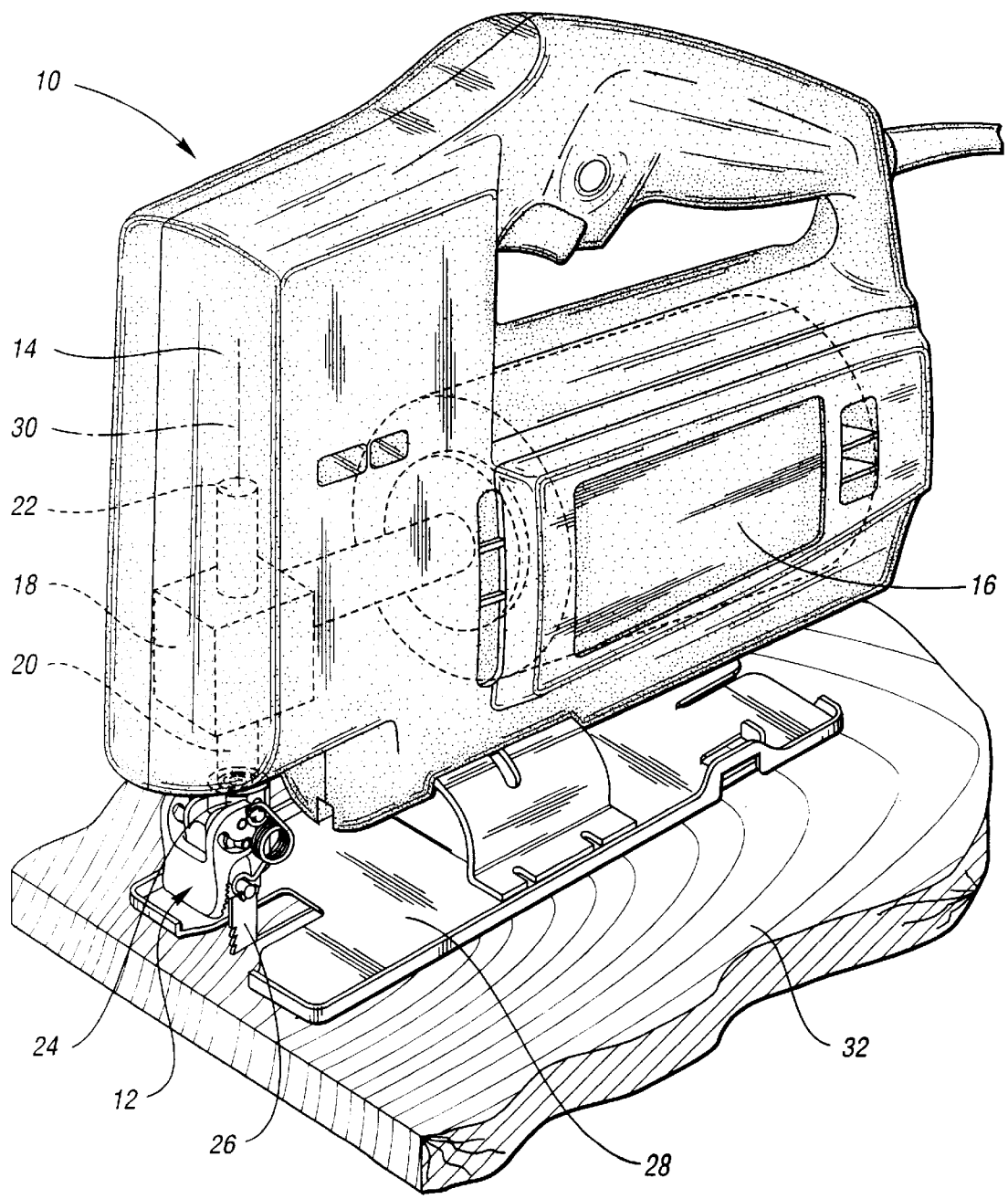
FIG. 1 is a perspective view of a jigsaw utilizing the blade clamp of the present invention.

Referring first to FIG. 1, a jigsaw 10 is shown utilizing a blade clamp 12 of the present invention. Jigsaw 10 comprises a motor housing 14 which supports a motor 16 connected to a drive mechanism 18. U.S. Pat. No. 4,283,855 to Nalley, incorporated by reference herein, illustrates a typical motor and drive mechanism. An annular drive shaft 20 (shown best in FIG. 2) is provided with a first end 22 connected to drive mechanism 18 and a second end 24 to which blade clamp 12 may be affixed. Blade clamp 12 will accept an elongated, generally planar blade 26 of rectangular cross-section such that blade 26 will extend below a surface plate 28 attached to motor housing 14. Drive shaft 20 and mounted blade 26 are reciprocally movable along a longitudinal shaft axis 30 so that movement of surface plate 28 along a piece of work material 32 will allow blade 26 to cut work material 32 along the direction of movement.

Figure 2:
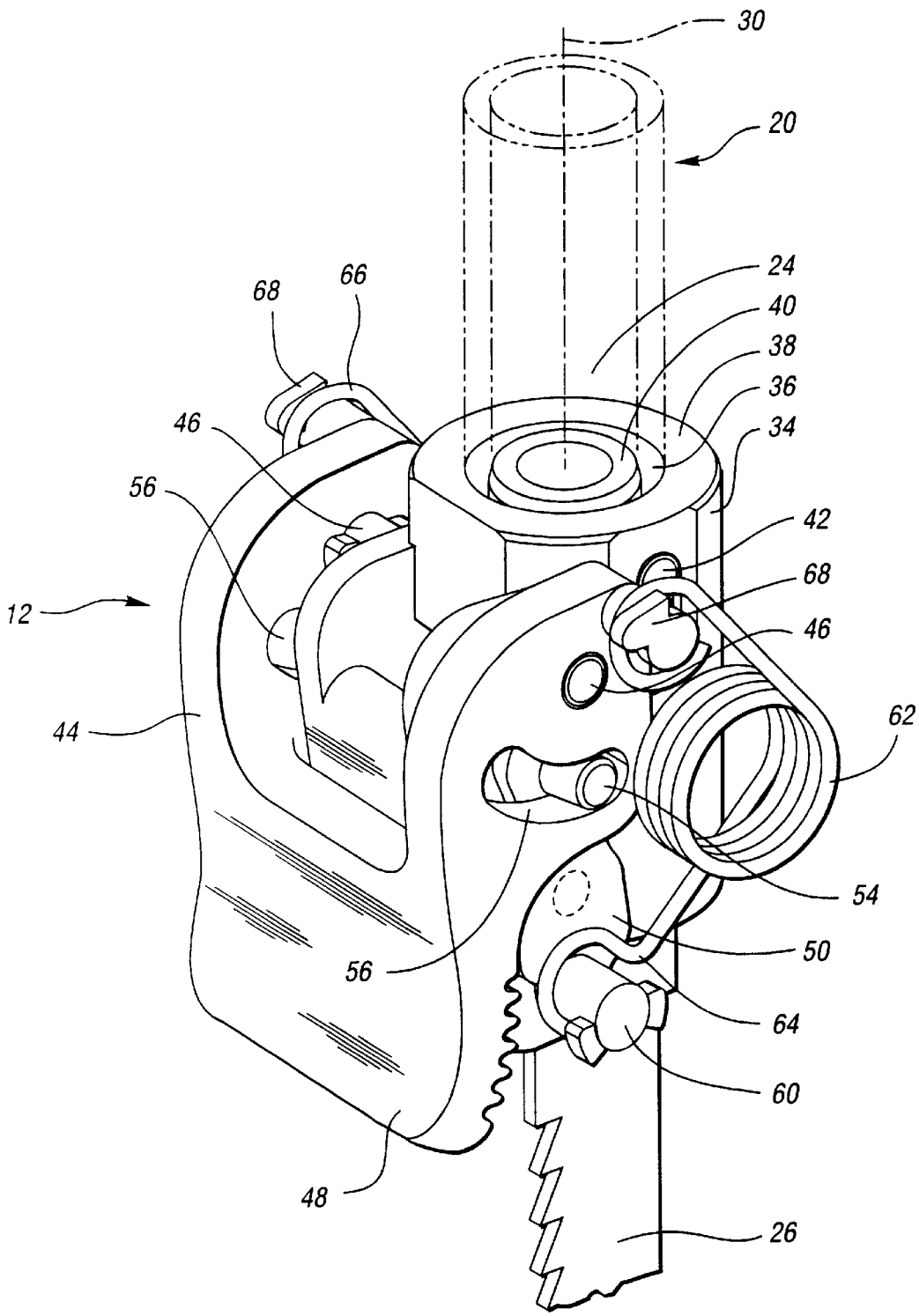
FIG. 2 is a perspective view of the preferred embodiment of the blade clamp as it interfaces with the drive shaft and blade.

FIG. 2 shows an enlarged view of blade clamp 12. Blade clamp 12 comprises a housing 34 which, in the preferred embodiment, is formed of an iron alloy using a metal injection-molded process as described generally in U.S. Pat. No. 4,710,223 to Matejczyk which is incorporated by reference for general background purposes. Use of this metal injection-molded (MIM) formulation markedly increases the durability of housing 34 which is subject to high shear loads from blade 26. Housing 34 has a connector groove 36 sized to accept drive shaft second end 24. Connector groove 36 is annular in shape such that drive shaft second end 24 is inserted between an outer connector sleeve 38 and an inner connector sleeve 40, with this configuration functioning to prevent potential deformation of drive shaft 20 during operation of jigsaw 10. Drive shaft second end 24, outer connector sleeve 38, and inner connector sleeve 40 are adapted to receive a pin 42 inserted therethrough in order to affix blade clamp 12 to drive shaft second end 24.

Again referring to FIG. 2, a lever 44 is pivotally mounted to housing 34 via a pair of pivot joints 46 protruding from either side of housing 34. Lever 44 is provided with a handle 48 and functions as a release device for accomplishing the removal of blade 26 from blade clamp 12. A pair of elongated links 50 (best shown in FIG. 3), each having a first end 52 provided with a link pin 54, are connected to lever 44 via a pair of arcuate slots 56 located on either side of lever 44 into which link pins 54 are slidably engageable. Slots 56 are sized to allow link pins 54 to shift away from housing 34 in order to accommodate blades of different widths without causing lever 44 to move outwardly. A second end 58 of each link 50 is provided with a link attachment knob 60. A pair of coiled springs 62 each have a first end 64 adapted for attachment to link attachment knobs 60 and a second end 66 adapted for attachment to either housing 34 or, in the preferred embodiment, a pair of lever attachment knobs 68 provided on lever 44 spaced from pivot joints 46. In this configuration, springs 62 act to force both lever 44 and links 50 into a locked position adjacent housing 34 during operation of jigsaw 10.

Figure 4A:
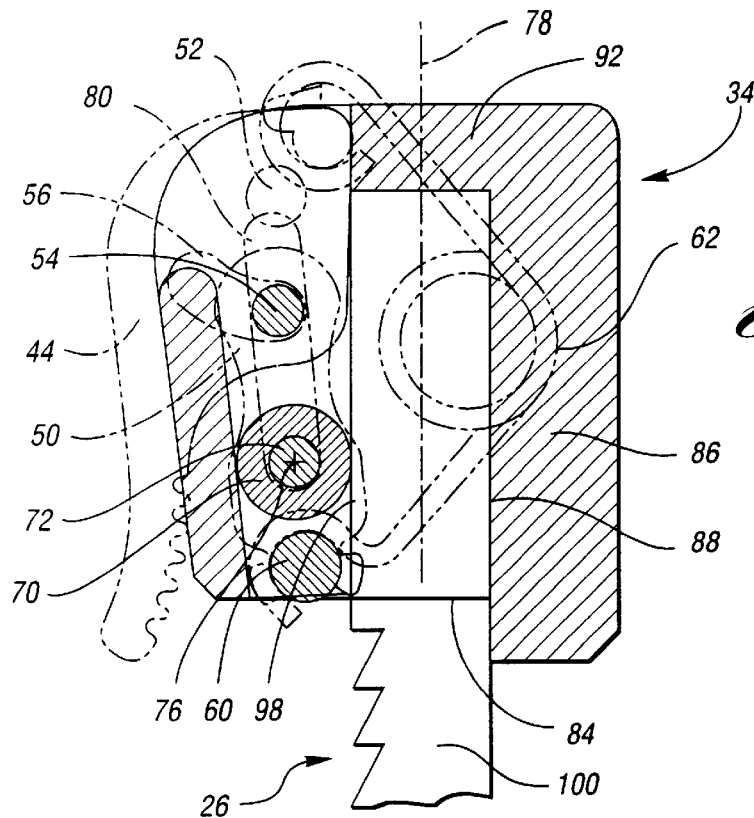
FIG. 4a is a side, longitudinal section of the housing showing the mechanism by which the blade is clamped by the roller when the lever is in the locked position.
Figure 5:
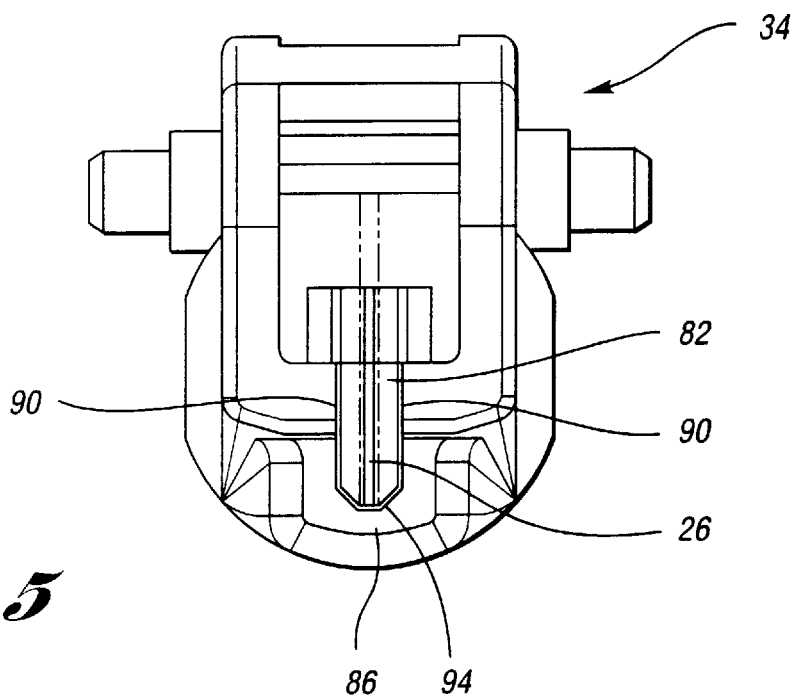
FIG. 5 is a top, cross-sectional view of the housing showing the engagement of the blade with the back channel wall.
Figure 6:
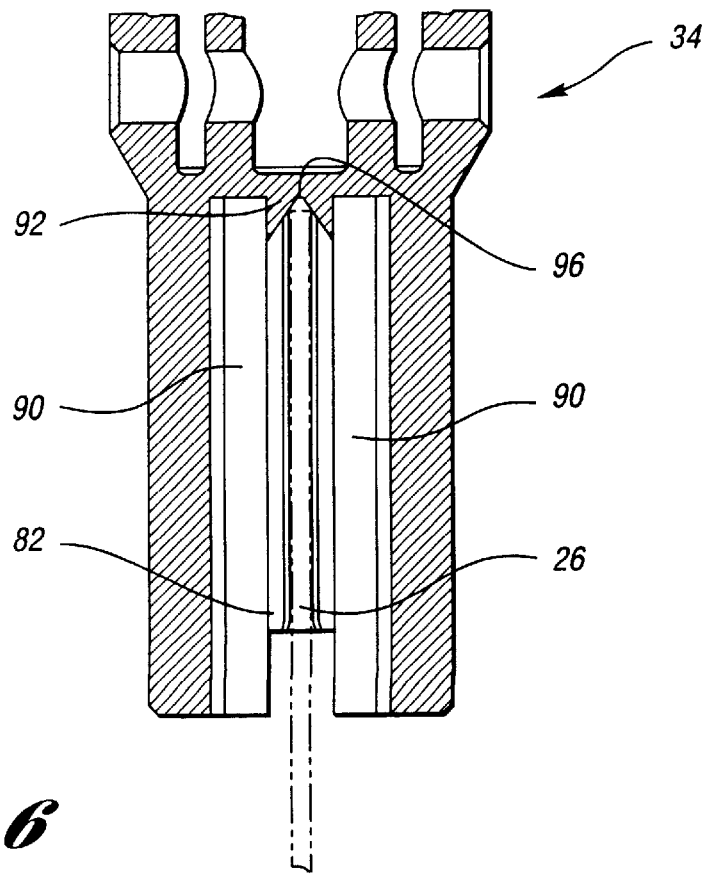
FIG. 6 is a side, longitudinal view of the housing showing the engagement of the blade with the abutment.

FIG. 3 shows an exploded view of lever 44, links 50, and spring 62 which is, in practice, attached therebetween. In addition, a cylindrical roller 70 is pivotally connected between links 50 by a roller pin 72 inserted through roller 70 and accepted into a recess 74 provided on each link So. As shown in FIG. 4a, roller 70 has a roller axis 76 perpendicular to a longitudinal blade axis 78 and is movable along a track 80 formed within housing 34. A channel 82 (best shown in FIGS. 5 and 6) formed within housing 34 is provided with an opening 84 into which blade 26 may be inserted. Channel 82 has a back channel wall 86 extending parallel to blade axis 78 and in contact with a first blade edge 88. A pair of spaced side channel walls 90 (best shown in FIGS. 5 and 6) are aligned in close proximity to blade 26. Also formed within channel 82 is an abutment 92 acting to limit the insertion distance of blade 26 into channel 82. In the preferred embodiment, as shown in FIG. 5, back channel wall 86 is provided with a tapered groove 94 sized to accept and center within channel 82 blades of different thicknesses. Likewise, in the preferred embodiment depicted in FIG. 6, abutment 92 is provided with a tapered groove 96 for the same purpose.

Referring again to FIG. 4a, shown is the preferred embodiment of the present invention, wherein track 80 is inclined relative to blade axis 78 so that movement of roller 70 within track 80 in a direction generally away from abutment 92 results in movement of roller 70 generally toward back channel wall 86 into engagement with a second blade edge 98. Although, in an alternative embodiment, track 80 may be oriented in the reverse direction such that movement of roller 70 generally toward abutment 92 results in movement of roller 70 generally toward back channel wall 86, this configuration is not advantageous. The former configuration provides that with downward motion of drive shaft 20 into work material 32, blade 26 tends to be forced more firmly against abutment 92. As drive shaft 20 rises, any forces tending to dislodge blade 26 from channel 82 would tend to urge roller 70 further toward back channel wall 86, thereby clamping blade 26 more securely. In another embodiment, blade 26 may be oriented such that roller 70 engages a side 100 of blade 26 rather than second blade edge 98. However, this configuration has been shown to provide clamping which is inferior in quality to that provided by the preferred embodiment.

Figure 4B:
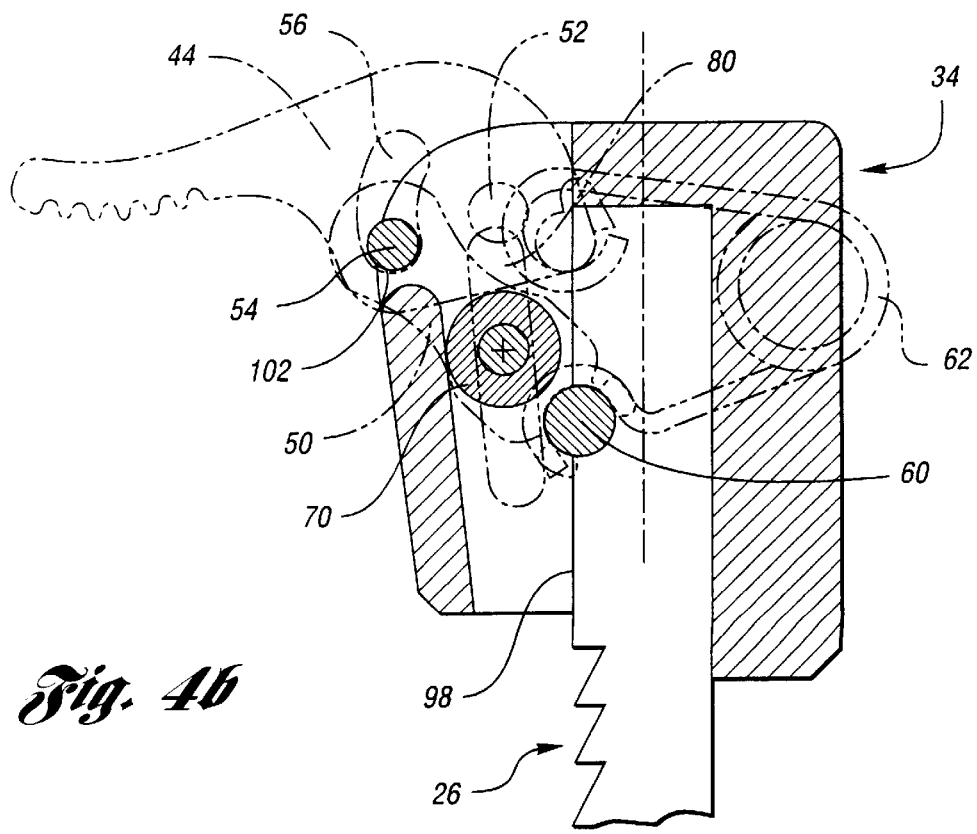
FIG. 4b is a side, longitudinal section of the housing showing the mechanism by which the blade is released when the lever is moved to the unlocked position.

Together, FIGS. 4a and 4b depict the coupling between the motion of lever 44, links 50, and roller 70 in order to clamp or release blade 26 with respect to housing 34. Referring again to FIG. 4a, blade 26 is shown inserted in channel 82 and clamped against back channel wall 86 and abutment 92 by roller 70. During operation of jigsaw 10, springs 62 continuously bias links 50 toward housing 34 which, through attachment to roller pin 72, forces roller 70 into engagement with second blade edge 98. Although springs 62 may be attached directly to roller pin 72, attaching springs 62 to link attachment knobs 60, which are spaced beyond roller pin 72, increases the mechanical advantage of springs 62 on roller 70 and thus provides a more secure clamp of blade 26. The coupling of links 50 to lever 44 forces lever 44 into a locked position adjacent housing 34. The vertical orientation of lever 44 when in the locked position allows for an unobstructed view of work material 32 during operation of jigsaw 10.

Referring next to FIG. 4b, in order to release blade 26 from housing 34, lever 44 is rotated away from housing 34 about pivot joints 52. Due to the orientation of lever 44, the rotational motion necessary to move lever 44 out of the locked position against the load of springs 62 may be accomplished with substantial mechanical advantage. As lever 44 is rotated to the unlocked position, each link pin 54 abuts an end 102 of each slot 56, thereby pulling roller 70 along track 80 away from second blade edge 98. In this manner, blade 26 is readily released and may be removed from housing 34 for replacement.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A reciprocating saw comprising:
    a motor housing;
    a motor supported within the motor housing;
    a drive mechanism connected to the motor;
    a drive shaft having a first end connected to the drive mechanism and a second end, the drive shaft being reciprocally movable along a longitudinal shaft axis; and a blade clamp for mounting a blade to the second end of the drive shaft, the blade clamp having
    a housing having a connector groove for affixing the housing to the drive shaft second end,
    a channel formed with an opening into which the blade is insertable, the channel having a back channel wall extending parallel to a longitudinal blade axis and in contact with a first blade edge, a pair of spaced side channel walls aligned in close proximity to the blade, and an abutment acting to limit the insertion distance of the blade into the channel,
    a roller having a roller axis perpendicular to the blade axis, the roller being movable along a track formed within the housing, the track being inclined relative to the blade axis and oriented so that movement of the roller within the track in a direction generally away from the abutment results in movement of the roller generally toward the back channel wall into engagement with a second blade edge,
    a lever pivotally mounted to the housing, the lever having a handle accessible to a user, wherein the lever may be rotated with respect to the housing from a locked position adjacent the housing to an unlocked position away from the housing,
    a pair of elongated links pivotally connected to the lever and pivotally supporting the roller therebetween, the links acting to translate rotation of the lever to movement of the roller such that rotation of the lever to the unlocked position pulls the roller away from the second blade edge allowing the blade to be removed from the channel, and
    at least one spring for biasing the roller toward the back channel wall to cause the roller to contact the second blade edge when the lever is in the locked position, thereby securely clamping the blade to the housing during operation of the reciprocating saw.

2. The reciprocating saw of claim 1, wherein the housing is formed of an iron alloy using an injection-molded process.

3. The reciprocating saw of claim 1, wherein the back channel wall is provided with a tapered groove sized to accept and center within the channel blades of different thicknesses.

4. The reciprocating saw of claim 1, wherein the abutment is provided with a tapered groove sized to accept and center within the channel blades of different thicknesses.

5. The reciprocating saw of claim 1, wherein the at least one spring has a first end which attaches to a link attachment knob.

6. The reciprocating saw of claim 5, wherein the link attachment knob is spaced beyond the pivotal connection of the roller.

7. The reciprocating saw of claim 1, wherein the at least one spring has a second end which attaches to a lever attachment knob.

8. The reciprocating saw of claim 7, wherein the lever attachment knob is spaced from the pivotal connection of the lever to the housing.

9. The reciprocating saw of claim 1, wherein the at least one spring comprises a pair of coiled springs.

10. A reciprocating saw comprising:
    a motor housing;
    a motor supported within the motor housing;
    a drive mechanism connected to the motor;
    a drive shaft having a first end connected to the drive mechanism and a second end, the drive shaft being reciprocally movable along a longitudinal shaft axis; and
    a blade clamp for mounting a blade to the second end of the drive shaft, the blade clamp having
    a housing having a connector groove for affixing the housing to the drive shaft second end,
    a channel formed with an opening into which the blade is insertable, the channel having a back channel wall extending parallel to a longitudinal blade axis and in contact with a first blade edge, at least one side channel wall aligned in close proximity to the blade, and an abutment acting to limit the insertion distance of the blade into the channel,
    a roller movable along a path inclined relative to the blade axis, so that movement of the roller in a first direction results in movement of the roller generally away from the back channel wall, whereas movement of the roller in a second direction results in movement of the roller generally toward the back channel wall into engagement with the blade,
    a release device adjustably mounted to the housing, the release device having a handle accessible to a user, wherein the release device is movable with respect to the housing from a locked position adjacent the housing to an unlocked position away from the housing,
    at least one elongated link pivotally connected to the release device and pivotally supporting the roller, the at least one link acting to couple movement of the release device to movement of the roller such that movement of the release device to the unlocked position pulls the roller in the first direction allowing the blade to be removed from the channel, and
    at least one spring for biasing the roller in the second direction to cause the roller to contact the blade when the release device is in the locked position, thereby securely clamping the blade to the housing during operation of the reciprocating saw.

11. The reciprocating saw of claim 10, wherein the at least one side channel wall comprises a pair of spaced side channel walls.

12. The reciprocating saw of claim 10, wherein the roller has a roller axis perpendicular to the blade axis.

13. The reciprocating saw of claim 10, wherein the path is a track formed within the housing.

14. The reciprocating saw of claim 10, wherein the track is inclined relative to the blade axis and oriented such that movement of the roller in a direction generally away from the abutment results in movement of the roller generally toward the back channel wall into engagement with a second blade edge.

15. The reciprocating saw of claim 10, wherein the release device comprises a lever pivotally mounted to the housing.

16. The reciprocating saw of claim 10, wherein the at least one link comprises a pair of elongated links pivotally mounted to the release device and pivotally supporting the roller therebetween.

17. The reciprocating saw of claim 10, wherein the housing is formed of an iron alloy using an injection-molded process.

18. The reciprocating saw of claim 10, wherein the back channel wall is provided with a tapered groove sized to accept and center within the channel blades of different thicknesses.

19. The reciprocating saw of claim 10, wherein the abutment is provided with a tapered groove sized to accept and center within the channel blades of different thicknesses.

20. The reciprocating saw of claim 10, wherein the at least one spring has a first end which attaches to a link attachment knob.

21. The reciprocating saw of claim 20, wherein the link attachment knob is spaced beyond the pivotal connection of the roller.

22. The reciprocating saw of claim 10, wherein the at least one spring has a second end which attaches to a lever attachment knob.

23. The reciprocating saw of claim 22, wherein the lever attachment knob is spaced from the pivotal connection of the lever to the housing.

24. The reciprocating saw of claim 10, wherein the at least one spring comprises a pair of coiled springs.

* * * * *